United States Patent [19]
Komatsu et al.

[11] Patent Number: 5,798,886
[45] Date of Patent: Aug. 25, 1998

[54] MAGNETIC DISK CHUCKING MECHANISM HAVING A NOTCHED ARM FOR CLAMPING A ROLLER

[75] Inventors: Hisateru Komatsu; Takashi Watanabe; Osamu Kojima, all of Tendo, Japan

[73] Assignee: Mitsumi Electric Co., Ltd., Tokyo, Japan

[21] Appl. No.: 720,244

[22] Filed: Sep. 26, 1996

[30] Foreign Application Priority Data

Sep. 27, 1995 [JP] Japan ................. 7-249740

[51] Int. Cl.$^6$ ................................. G11B 17/028
[52] U.S. Cl. ................. 360/99.05; 360/99.08; 360/99.12; 369/270
[58] Field of Search .................. 360/99.05, 99.12, 360/99.08; 369/270, 271, 282

[56] References Cited

U.S. PATENT DOCUMENTS

| | | | |
|---|---|---|---|
| 4,680,655 | 7/1987 | Sugawara | 369/270 |
| 4,855,850 | 8/1989 | Nagaoka et al. | 360/99.05 |
| 5,103,358 | 4/1992 | Munekata | 369/270 |
| 5,450,260 | 9/1995 | Sakaguchi et al. | 369/270 |

*Primary Examiner*—Stuart S. Levy
*Assistant Examiner*—Kevin M. Watkins
*Attorney, Agent, or Firm*—Frishauf, Holtz, Goodman, Langer & Chick

[57] ABSTRACT

A magnetic disk chucking mechanism comprises a disk table (21) having an aperture (21a) formed at a position apart from the center of the disk table (21), an arm (22) attached to the lower surface of the disk table, and a roller 23 held by the arm and protruding from the upper surface of the disk table (21) through the aperture (21a). The arm (22) has elasticity and is directly fixed to the disk table (21) at least at one position apart from the roller (23). The roller (23) is held by the arm (22) to be movable within the aperture (21a) at least in a radial direction of the disk table (21).

4 Claims, 4 Drawing Sheets

1

MAGNETIC DISK CHUCKING MECHANISM HAVING A NOTCHED ARM FOR CLAMPING A ROLLER

BACKGROUND OF THE INVENTION

This invention relates to a magnetic disk drive for carrying out data write/read operations to and from a magnetic disk such as a flexible magnetic disk and, in particular, to a magnetic disk chucking mechanism which is a part of a rotation driving mechanism for driving a magnetic disk.

A chucking mechanism of this type comprises a disk table having an aperture formed at a position apart from the center of the disk table, an arm attached to the lower surface of the disk table, and a roller coupled to the arm and protruding from the upper surface of the disk table through the aperture. The arm has a hole formed at one end for insertion of a support pin. The support pin serves to attach the one end of the arm to the lower surface of the disk table. The support pin has a nose portion formed at its head. On the other hand, the disk table is provided with an opening for insertion of the nose portion. The nose portion is made to protrude towards the upper surface of the disk table through the hole of the arm and the opening of the disk table. The nose portion thus protruding towards the upper surface is caulked or deformed so that the support pin is fixed to the disk table. A rod spring serves to urge the arm upwards so that the other end of the arm is brought into contact with the lower surface of the disk table.

As described above, the conventional chucking mechanism requires the support pin to attach the arm to the disk table. In addition, the rod spring is required to urge the arm upwards. Attachment of the support pin and the rod spring to the disk table must be manually carried out. In particular, the process of caulking or deforming the nose portion of the support pin is difficult to perform. Because the support pin and the rod spring are required, the number of components is increased. This constitutes a factor in creating a high production cost.

SUMMARY OF THE INVENTION

It is therefore an object of this invention to provide a magnetic disk chucking mechanism which is easy to manufacture and which has a small number of components.

A magnetic disk chucking mechanism to which this invention is applicable comprises a disk table having an aperture formed at a position apart from the center of the disk table, an arm attached to the lower surface of the disk table, and a roller held by the arm and protruding from the upper surface of the disk table through the aperture.

According to an aspect of this invention, the arm has elasticity and Is directly fixed to the disk table at least at one position apart from the roller. The roller is held by the arm to be movable within the aperture at least in a radial direction of the disk table.

DESCRIPTION OF THE PREFERRED EMBODIMENTS

Figure 1:
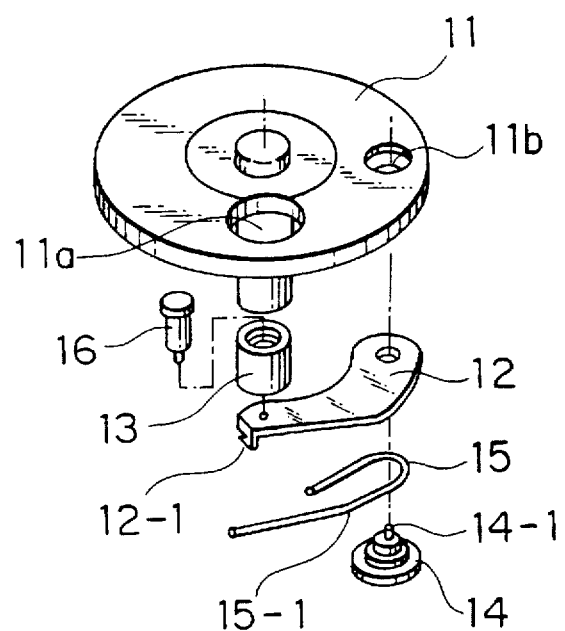
FIG. 1 is an exploded perspective view of a conventional magnetic disk chucking mechanism.
Figure 2:
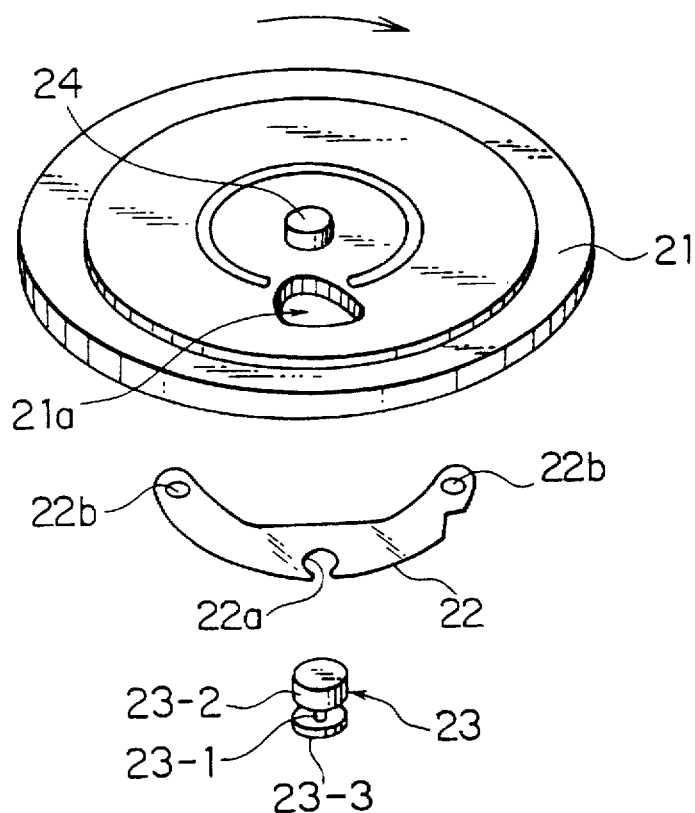
FIG. 2 is an exploded perspective view of a magnetic disk chucking mechanism according to a first embodiment of this invention.
Figure 3:
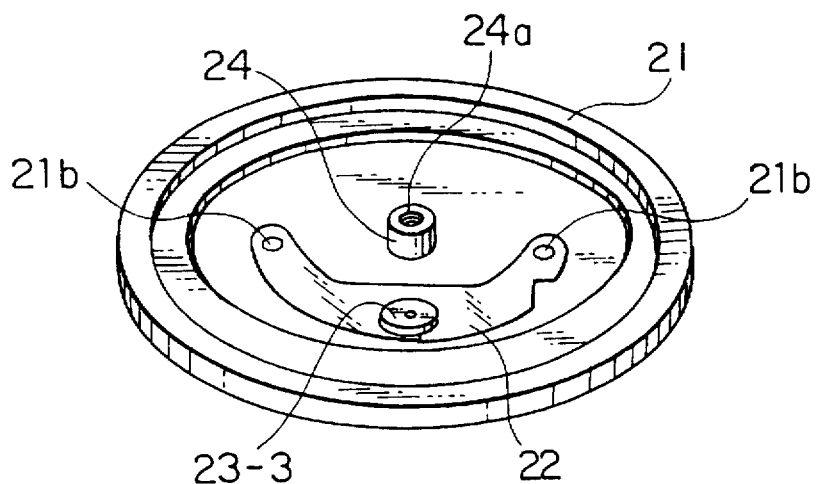
FIG. 3 is a perspective view of the chucking mechanism illustrated in FIG. 2 as seen from its bottom side.
Figure 4:
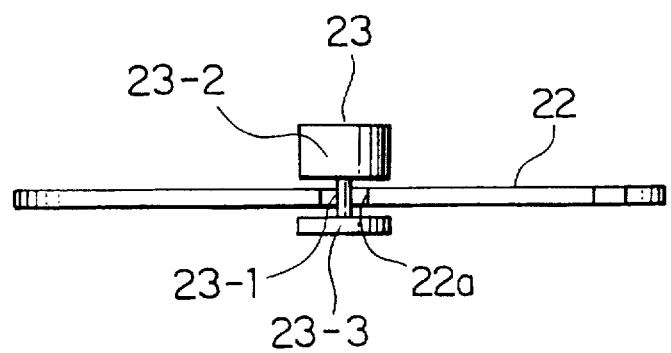
FIG. 4 is a side view showing the relationship between an arm and a roller illustrated In FIG. 2.
Figure 5:
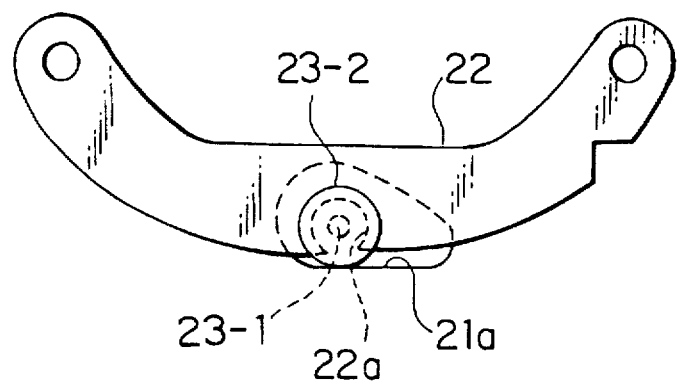
FIG. 5 is a plan view of the arm and the roller illustrated in FIG. 4.

Referring to FIG. 1, a conventional magnetic disk chucking mechanism of a magnetic disk drive will first be described. The magnetic disk chucking mechanism comprises a disk table 11, an arm 12, and a roller 13. The disk table 11 has one surface for mounting a magnetic disk and another surface opposite thereto. Throughout the specification, the one surface and the other surface will be referred to as an upper surface and a lower surface, respectively. The disk table 11 is provided with an aperture 11a formed at a position apart from the center of the disk table 11. The arm 12 is made of metal and has a hardness nearly equal to that of a rigid body. The arm 12 is rotatably coupled at one end to the disk table 11 through a support pin 14. Thus, the other end of the arm 12 is movable in a radial direction of the disk table 11. The support pin 14 is provided with a nose portion 14-1 formed at its head. On the other hand, the disk table 11 is provided with a hole 11b for insertion of the nose portion 14-1. The nose portion 14-1 of the support pin 14 is made to protrude towards the upper surface of the disk table 11 through the hole 11b with the arm 12 attached to the lower surface. The nose portion 14-1 thus protruding towards the upper surface is caulked or deformed so that the support pin 14 is fixed to the disk table 11.

The support pin 12 also serves to fix a rod spring 15 to the disk table 11 together with the arm 12. An approximate half of the rod spring 15 is upwardly bent. A top end of the rod spring 15 is engaged with a hook portion 12-1 formed at a top end of the arm 12. Thus, the rod spring 15 serves to urge the arm 12 upwards so that the other end of the arm 12 is brought into contact with the lower surface of the disk table 11. The roller 13 is rotatable supported through a roller shaft 16 on the upper surface of the arm 12 at the other end. The roller 13 is inserted into the aperture 11a of the disk table 11 with its upper part protruding from the upper surface of the disk table 11.

As described above, the conventional chucking mechanism requires the support pin 14 to attach the arm 12 to the disk table 11. In addition, the rod spring 15 is required to urge the arm 12 upwards. Attachment of the support pin 14 and the rod spring 15 to the disk table 11 must be manually carried out. Particularly, it is not easy to caulk or deform the nose portion 14-1 of the support pin 14. Because the support pin 14 and the rod spring 15 are essential, the number of components is increased. This constitutes a factor in creating a high production cost.

Referring to FIGS. 2 through 5, a magnetic disk chucking mechanism according to a preferred embodiment of this invention will be described. The magnetic disk chucking mechanism comprises a disk table 21, an arm 22, and a roller 23. The disk table 21 comprises a plastic magnet of a generally circular shape. The disk table 21 is provided with an aperture 21a formed at a position apart from the center of the disk table 21. At the center of the disk table 21, an insertion hole is formed with a rotation shaft 24 press-fitted therein. The rotation shaft 24 protrudes from both of the upper and the lower surfaces of the disk table 21. The rotation shaft 24 has an internal thread 24a formed at a lower end thereof. On the lower surface of the disk table 21, two protrusions 21b are formed in order to attach the arm 22 to the disk table 21. The disk table 21 is rotatable in a direction depicted by an arrow in FIG. 2.

The arm 22 comprises a magnetic and elastic thin plate and is attached to the lower surface of the disk table 21. The arm 22 is configured into a generally semicircular arc, namely, an arc having a center angle approximately equal to 180°. The arm 22 is provided with a generally circular notch 22a formed at its center to receive a shaft portion 23-1 of the roller 23 which will later be described. The arm 22 has a pair of holes 22b formed at opposite ends thereof, respectively, to receive the protrusions 21b of the disk table 21. In order to support the roller 23 and to urge the roller 23 so that the roller 23 is protruded from the aperture 21a of the disk table 21, the arm 22 is directly attached to the disk table 21 at positions apart from the notch 22a to be engaged with the roller 23, namely, at the opposite ends of the arm 22. Specifically, the protrusions 21b of the disk table 21 are inserted into the holes 22b of the arm 22 to attach the arm 22 to the lower surface of the disk table 21. Then, peripheral walls of the holes 22b are adhered to the protrusions 21b by the use of an adhesive. Thus, the arm 22 is directly fixed to the disk table 21.

The roller 23 further comprises a roller portion 23-2 in addition to the shaft portion 23-1. The roller portion 23-2 is located within the aperture 21a of the disk table 21 and is freely movable within the aperture 21a. An upper part of the roller portion 23-2 is protruded from the upper surface of the disk table 21. The shaft portion 23-1 has a diameter smaller than that of the notch 22a of the arm 22. The shaft portion 23-1 has a washer 23-3 formed at its top end. The washer 23-3 is formed, for example, by caulking or deforming the top end of the shaft portion 23-1. A gap between the roller portion 23-2 and the washer 23-3 is greater than the thickness of the arm 22. By locating the shaft portion 23-1 in the notch 22a, the roller 23 is rotatably held by the arm 22. In this state, the roller 23 is possibly released from engagement with the arm 22 to drop off. However, when the roller 23 held by the arm 22 as mentioned above is located within the aperture 21a of the disk table 21, the outer peripheral surface of the roller portion 23-2 is brought into contact with the inner peripheral edge of the aperture 21a. Thus, the roller 23 is prevented from dropping off out of engagement with the arm 22.

In this embodiment, the roller 23 is freely movable within the aperture 21a of the disk table 21. However, this arrangement is not essential. It is sufficient that the roller 23 is movable within the aperture 21a of the disk table 21 at least in a radial direction of the disk table 21.

Figure 6:
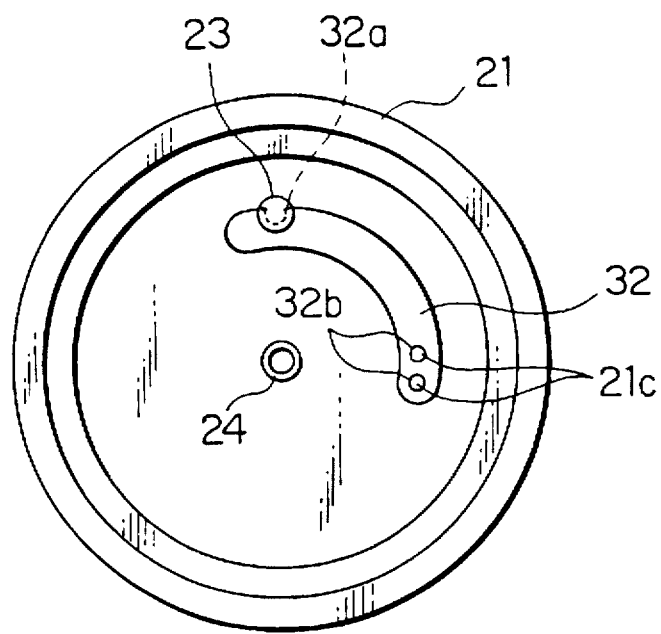
FIG. 6 is a bottom view of a magnetic disk chucking mechanism according to a second embodiment of this invention.

Referring to FIG. 6, description will proceed to a second embodiment of this invention. In FIG. 6, a magnetic disk chucking mechanism according to the second embodiment has a structure similar to that of the first embodiment except that the arm 22 is replaced by an arm 32. Therefore, the similar parts are designated by like reference numerals and will not be described any longer.

The chucking mechanism is different in structure with respect to the arm 32 as compared to the arm 22 in the first embodiment. The arm 32 is formed into an arc having a center angle approximately equal to 90°. The arm 32 has a notch 32a formed at its one end. The roller 23 is held in the notch 32a to be freely movable within the notch 32a. The arm 32 is provided with a pair of holes 32b formed at two positions on the other end, respectively. The disk table 21 is provided with protrusions 21c formed on its lower surface and adapted to be inserted into the holes 32b. The other end of the arm 32 is fixed to the disk table 21 in the manner similar to that described in conjunction with the first embodiment. The disk table 21 has an opening for insertion of the roller 23, although not shown in the figure.

Figure 7:
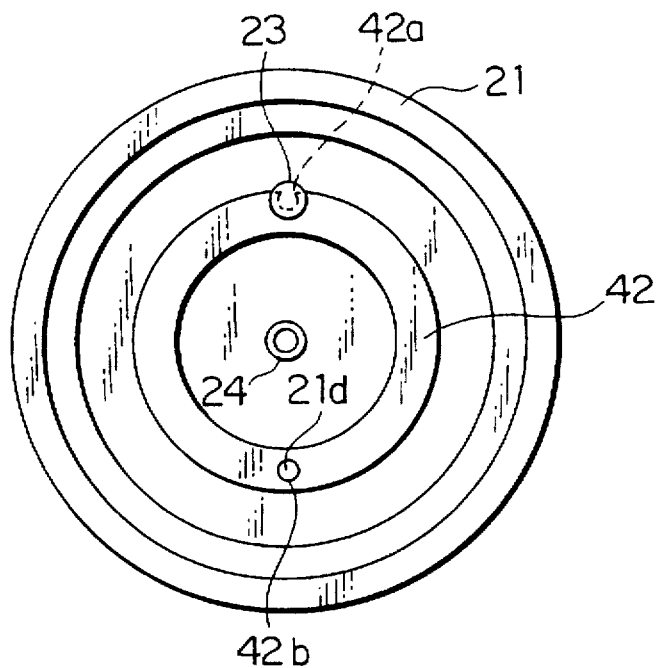
FIG. 7 is a bottom view of a magnetic disk chucking mechanism according to a third embodiment of this invention.

Referring to FIG. 7, a third embodiment of this invention will be described. In FIG. 7, a magnetic disk chucking mechanism according to the third embodiment has a structure similar to that of the first embodiment except that the arm 22 is replaced by an arm 42. Therefore, the similar parts are designated by like reference numerals and will not be described any longer.

The chucking mechanism is different in structure with respect to the arm 42 as compared to the arm 22 in the first embodiment. The arm 42 is formed into a ring. The arm 42 is provided with a notch 42a formed at one end in its diametrical direction. Within the notch 42a, the roller 23 is held to be freely movable. The arm 42 is provided with a hole 42b formed at the other end in its diametrical direction. A protrusion 21d is formed on the lower surface of the disk table 21 to be inserted into the hole 42b. The other end of the arm 42 is fixed to the disk table 21 in the manner similar to that described in conjunction with the first embodiment. The disk table 21 has an opening for insertion of the roller 23, although not shown in the figure.

As described above, the magnetic disk chucking mechanism according to this invention does not require the support pin and the rod spring which have been essential in the conventional chucking mechanism. Accordingly, assembling is easy and the number of components is reduced so that the production cost is decreased.

What is claimed is:

1. A magnetic disk chucking mechanism comprising:

a disk table having an aperture formed at a position apart from a center of said disk table; and a roller held by an arm and protruding from an upper surface of said disk table through said aperture;

said arm hating elasticity and being directly fixed to said disk table at least at one position apart from said roller;

said roller being held by said arm to be movable within said aperture;

said roller having a roller portion, a shift portion formed under said roller portion, and a washer formed at a top end of said shaft portion;

said shaft portion having a diameter considerably smaller than diameters of said roller portion and said washer;

said arm being provided with a notch formed at a position where said roller is to be held; and said notch having a diameter greater than a diameter of said shaft portion and smaller than the diameters of said roller portion and said washer so that said roller is held in said notch to be freely moveable within said notch.

2. A magnetic disk chucking mechanism as claimed in claim 1, wherein:

said arm has an intermediate portion provided with said notch and said arm has opposite ends provided with respective holes;

said disk table has two protrusions formed on a lower surface thereof for insertion into said holes; and the opposite ends of said arm are adhered to said two protrusions.

3. A magnetic disk chucking mechanism as claimed in claim 1, wherein:

said arm is configured into an arc and is provided at a first end thereof with said notch and at a second end thereof with at least one hole;

said disk table has at least one protrusion formed on a lower surface thereof for insertion into said at least one hole; and said second end of said arm is adhered to said protrusion.

4. A magnetic disk chucking mechanism as claimed in claim 1, wherein:

said arm is configured into a ring and is provided at a first end thereof in a diametrical direction with said notch and at a second end thereof with at least one hole;

said disk table has at least one protrusion formed on a lower surface thereof for insertion into said at least one hole; and said second end of said arm is adhered to said protrusion.

\* \* \* \* \*